(12) United States Patent
Arai

(10) Patent No.: US 6,196,613 B1
(45) Date of Patent: Mar. 6, 2001

(54) FLATTABLE SEAT STRUCTURE OF AUTOMOBILE

(75) Inventor: Tomiji Arai, Kanagawa-ken (JP)

(73) Assignee: Ikeda Bussan Co., Ltd, Kanagawa-ken (JP)

( * ) Notice: Subject to any disclaimer, the term of this patent is extended or adjusted under 35 U.S.C. 154(b) by 0 days.

(21) Appl. No.: 09/353,784

(22) Filed: Jul. 15, 1999

(30) Foreign Application Priority Data

Jul. 27, 1998 (JP) .................................................. 10-211461

(51) Int. Cl.⁷ ........................................................ B60N 2/02
(52) U.S. Cl. ..................................... 296/65.13; 296/65.09; 296/69; 297/334; 297/335; 297/378.12
(58) Field of Search ............................... 296/65.01, 65.09, 296/65.13, 65.14, 69, 66, 65.05; 297/344.1, 313, 331, 334, 335, 336, 378.1, 378.12, 378.13, 354.13, 366, 367

(56) References Cited

U.S. PATENT DOCUMENTS

| | | | |
|---|---|---|---|
| 2,916,325 | * 12/1959 | Estes et al. . | |
| 3,171,682 | * 3/1965 | Buser et al. . | |
| 5,156,437 | * 10/1992 | Hayakawa et al. | 297/335 |
| 5,156,438 | * 10/1992 | Hayakawa et al. | 297/335 |
| 5,158,338 | * 10/1992 | Hayakawa et al. | 297/335 |
| 5,195,802 | * 3/1993 | Hayakawa et al. | 297/335 |

FOREIGN PATENT DOCUMENTS 7-27239    6/1995 (JP) .

* cited by examiner

*Primary Examiner*—Stephen T. Gordon
*Assistant Examiner*—Patricia Engle
(74) *Attorney, Agent, or Firm*—Nath & Associates; Gary M. Nath; Harold L. Novick

(57) ABSTRACT

A flattable seat structure of an automobile includes: a slide rail fixed to a floor of the automobile; a seat cushion having a front roller which is engaged with the slide rail in a front-and-rear direction slidably; a first lock mechanism for maintaining the seat cushion in a seated state; a seat back having a lower-end roller which is engaged with the slide rail in the front-and-rear direction slidably; a second lock mechanism for maintaining the seat back in a seated state; a cushion link connected with a middle fulcrum of the seat cushion and connected with a middle portion of the slide rail; and a back link whose one end is connected with a middle fulcrum of the seat back positioned in an upper side further than the lower-end roller, the other end of the back link being connected with the middle portion of the slide rail. In the construction, after the first and second lock mechanism are released, a back surface of the seat cushion and a rear surface of the seat back are facing and in a same horizontal level.

8 Claims, 7 Drawing Sheets

FLATTABLE SEAT STRUCTURE OF AUTOMOBILE

BACKGROUND OF THE INVENTION

1. Field of the Invention

The present invention relates to a flattable seat structure of an automobile.

2. Description of Relevant Art

In general, some seats of an automobile have a flat structure which enables a seat cushion and a seat back to be substantially level with each other horizontally for a rest and a good sleep and for wide utilization of a space in an automobile.

As known in Japanese Utility Model Application Publication No. 7-27239, in such a flat structure, a seat cushion pivots on its front-end fulcrum to a front side so as to be in a horizontally inverted state, and a seat back pivots on the lower-end fulcrum to the front side so as to be in a horizontally front-folded state. As a result, a rear surface of the seat cushion and a back surface of the seat back are substantially level with each other to form a flat surface.

However, in such a conventional art, since the seat cushion is constituted so as to be inverted to the front side on its front-end fulcrum, the flat seat is projected front by a whole length of the seat cushion. Therefore, it is difficult to apply this conventional structure to an automobile which does not have an enough space in a front side of the seat.

SUMMARY OF THE INVENTION

The present invention has been achieved with such points of the conventional art in view. It therefore is an object of the present invention to provide a flattable seat structure of an automobile which enables a seat to be flat even if the automobile does not have an enough space in a front side of the seat.

To achieve the object, according to a first aspect of the present invention, there is provided a flattable seat structure of an automobile, comprising: a slide rail fixed to a floor of the automobile; a seat cushion composing a seat, the seat cushion having a front roller at its front side projected to a vehicle transverse direction outer side, the front roller being engaged with the slide rail in a front-and-rear direction slidably; a first lock mechanism for maintaining the seat cushion in a seated state; a seat back composing the seat, the seat back having a lower-end roller at its lower end projected to the vehicle transverse direction outer side, the lower-end roller being engaged with the slide rail in the front-and-rear direction slidably; a second lock mechanism for maintaining the seat back in a seated state; a cushion link whose one end is connected with a middle fulcrum of the seat cushion positioned in a rear side further than the front roller, the other end of the cushion link being connected with a middle portion of the slide rail; and a back link whose one end is connected with a middle fulcrum of the seat back positioned in an upper side further than the lower-end roller, the other end of the back link being connected with the middle portion of the slide rail, wherein after the first lock mechanism is released, the front roller is slid to the rear side so that the seat cushion is turned over in a forward-rotational direction: and wherein after the second lock mechanism is released, the lower-end roller is slid to the rear side so that the seat back is folded in a forward-rotational direction, thereby a back surface of the seat cushion, which faces upward and is in a horizontal state, is substantially level with a rear surface of the seat back which faces upward and is in the horizontal state.

According to the first aspect of the present invention, when the seat cushion and the seat back are pivoted to the front side, since the respective front movements are restricted by the cushion link and the back link, while the seat cushion and the seat back slide the front roller and the lower-end roller along the slide rail, they pivot on the spot and thus in the inverted and front-folded state. Therefore, the invention of the first aspect is applicable to an automobile which does not have an enough space in a front side of the seat. Moreover, in the state that the seat cushion and the seat back are flattened, since their front-and-rear movements are restricted by the cushion link and the back link, there arises no problem even if the respective lock mechanisms are released.

A second aspect of the invention depending from the first aspect provides the flattable seat structure of the automobile further comprising: a fixing link fixed to a side surface of the seat cushion, the front roller being provided to a front end of the fixing link, the middle fulcrum being provided at a rear end of the fixing link.

According to the second aspect of the invention, since the front roller and the middle fulcrum are set to both the ends of the fixing link attached to the side surface of the seat cushion, their setting is easy and an interval between them becomes constant.

A third aspect of the invention depending from the first or the second aspect provides the flattable seat structure of the automobile further comprising: a bracket provided to a vicinity of the middle portion of the slide rail, the bracket supporting the cushion link and the back link so that they are capable of pivoting.

According to the third aspect, since the end portions of the cushion link and back link are supported to the bracket standing in the vicinity of a midway portion of the slide rail via a shaft, it is not necessary to execute a process for supporting their end portions to the slide rail via a shaft, and thus manufacture of the slide rail becomes easy, and deterioration of rigidity of the slide rail can be prevented.

A fourth aspect of the invention depending from the third aspect provides the flattable seat structure of the automobile wherein the bracket is formed with a stepped section for upwardly supporting the middle portion of the slide rail from a lower side of the slide rail.

According to the fourth aspect, since the stepped section for supporting the midway portion of the slide rail to the bracket from its lower side is formed, deterioration of the midway portion of the slide rail is prevented.

A fifth aspect of the invention depending from the first aspect provides the flattable seat structure of the automobile wherein a notched section where the lower-end roller is taken in and out is formed on an upper portion of the slide rail.

According to the fifth aspect, since the notched section where the lower-end roller of the back link can be taken in and out is formed on the upper portion of the slide rail, the seat back can be moved sufficiently front with it standing by taking the lower-end roller out of the notched section towards the upper side, and thus a spare tire or a luggage can be easily taken in and out of a concave section in case the concave section is mounted to be located below the seat.

A sixth aspect of the invention depending from the first aspect provides the flattable seat structure of the automobile wherein, portions of the slide rail, which correspond to a position where the front roller is located when the seat cushion is in the seated state, to a position where the front roller is located when the seat cushion is in the horizontal state, to a position where the lower-end roller is located when the seat back is in the seated state and to a position where the lower-end roller is located when the seat back is in the horizontal state, are provided so that their dimensions in the up-and-down direction substantially coincide with diameters of the front roller and the lower-end roller; and a dimension of the slide rail in the up-and-down direction other than the four positions is set so as to be larger than the diameters of the front roller and the lower-end roller.

According to the sixth aspect, as for the up-and-down dimension of the slide rail, since only the portions corresponding to each rollers in the seated position and in the flat position are made to substantially coincide with the diameters of the rollers, the manufacture and installation adjustment of the slide rail become easier than the case where the up-and-down dimension of the whole slide rail is set accurately. Since the up-and-down dimensions in the seated position and in the flat position where the rollers stop for a long time substantially coincide with the diameters of the rollers, looseness in the seated position and in the flat position is prevented. Since the rollers just move within a range between the seated position and the flat position, the movements of the rollers are made to be easy by setting the up-and-down dimension larger than the diameters of the rollers.

A seventh aspect of the invention depending from the sixth aspect provides the flattable seat structure of the automobile wherein, the slide rail is composed of an upper surface section, a side surface section and a lower surface section; and the upper surface section of the slide rail corresponding to the four positions is projected downward, thereby the dimension between a lower surface of the upper surface section and an upper surface of the lower surface section substantially coincides with the diameters of the front roller and the lower-end roller.

According to the seventh aspect, since the up-and-down dimensions are set so as to substantially coincide with the diameters of the rollers by partially lowering the upper surface portion of the slide rail, the lower surface portion of the slide rail is flat along the longitudinal direction, and thus the movements of the rollers become easy.

An eighth aspect of the invention depending from the fifth aspect provides the flattable seat structure of the automobile wherein, a concave section for housing luggage including a spare tire is formed in a position below the seat back on the floor of the automobile.

According to the eighth and eighth aspects, since the seat back can be moved sufficiently frontward, and thus the spare tire or luggage can be easily taken in and out of the concave section, thereby improving space save in the automobile.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENT

There will be described below preferred embodiment of the present invention with reference to the drawings. This embodiment shows a flat structure relating to a third row seat 2 in a third line provided at the rear of a second row seat 1 as "a front seat" in a second line of seats in the two lines provided at the rear of a driver's seat in a station wagon.

Figure 6:
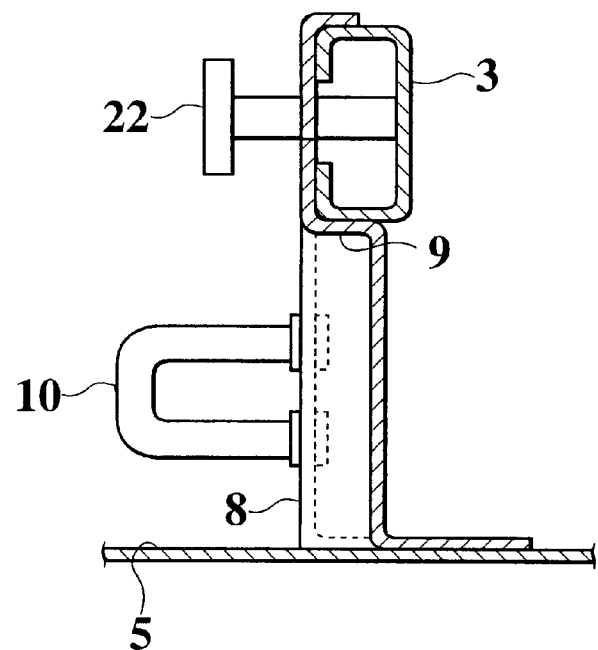
FIG. 6 is a sectional view taken along the arrow VI—VI in FIG. 1.

A reference numeral 3 is a slide rail, and it is fixed to a floor 5 by front and rear leg sections 4. A pair of slide rails 3 are provided respectively in right and left positions, and they have a C-shaped cross section with an opening along a longitudinal direction on their inner surfaces. The slide rail 3 is provided in a portion from a cabin to a luggage room R, and a concave section 7 for housing a spare tire 6 is formed between the right and left slide rails 3 in the luggage room A bracket 8 as "a peripheral member" stands in a vicinity of a midway portion of the slide rail 3 slightly near to the front from the middle portion. The bracket 8 is square viewed from the side, and its upper portion is, as shown in FIG. 6, joined to a portion of the slide rail 3 from its inner side to its upper surface. A stepped section 9 which is convexly provided to a vehicle transverse direction outer side is formed on a lower side of the bracket 8, and the midway portion of the slide rail 3 is placed on the stepped section 9. Therefore, the stepped section 9 prevents downward deformation of the midway portion of the slide rail 3.

Figure 8:
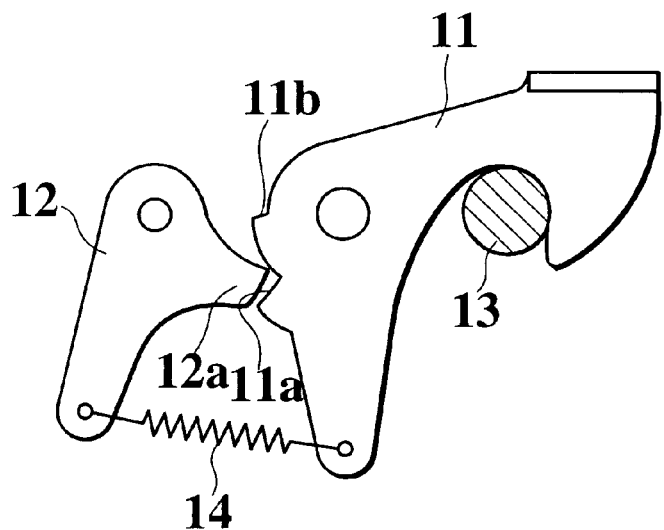
FIG. 8 is an enlarged drawing showing a hook and a stopper.

A U-shaped striker 10 is fixed to the front portion of the bracket 8. Moreover, a hook 11 and a stopper 12 as a "second lock mechanism" are provided on the rear portion of the bracket 8 so as to be capable of pivoting (see FIG. 8). The hook 11 has a form such that it can be engaged with a shaft portion of a lower roller 13, mentioned later, and the hook 11 can be pivoted in a release direction by lifting its upper portion via a handle. A projection 12a of the stopper 12 is engaged with two engagement sections 11a and 11b of the hook 11. Moreover, the hook 11 and the stopper 12 are connected with each other at their lower ends by a tension spring 14. Therefore, in the case where the hook 11 is desired to be lifted by pivoting it in the release direction, the projection 12a of the stopper 12 is engaged with the upper engagement section 11b so that the release state is maintained. By pivoting the stopper 12 in the clockwise direction, the engagement with the upper engagement section 11b is released so that the stopper 12 can be engaged with the former lower engagement section 11a.

The third seat 2 is composed of a seat cushion 15 and a seat back 16. A fixing link 17 is attached to a side surface of the seat cushion 15 so as to be close to the front, and a front roller 18, which is projected to the vehicle transverse direction outer side, is provided to a front end of the fixing link 17 as to be engaged with the slide rail 3 slidably to the front and rear side. A middle fulcrum S1 is set to a rear end of the fixing link 17, and the middle fulcrum S1 and the bracket 8 are connected with each other by a cushion link 19. Since the front roller 18 and the middle fulcrum S1 are set to both the ends of the fixing link 17 attached to the side surface of the seat cushion 15, their setting is easy and an interval therebetween becomes constant.

Figure 9:
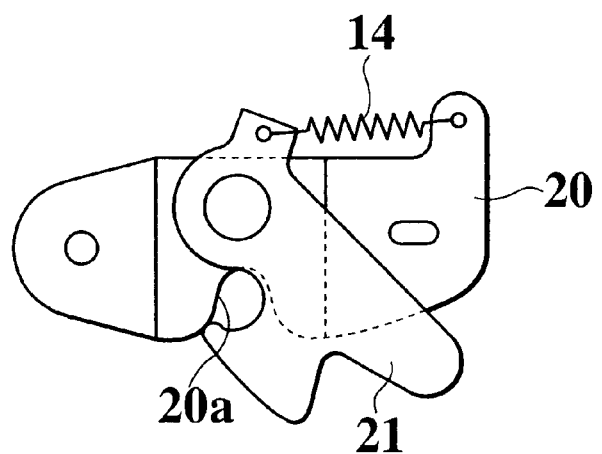
FIG. 9 is an enlarged drawing showing a fixing plate and a lock plate.

A fixing plate 20 and a lock plate 21 as a "first lock mechanism" are provided to a rear end of the side surface of the seat cushion 15 (see FIG. 9). The lock plate 21 has a form such that it can be engaged with the striker 10. A curved section 20a is formed on a lower edge center of the fixing plate 20. The tension spring 14 is provided also between the fixing plate 20 and the lock plate 21.

A lower-end roller 13, which is projected to the vehicle transverse direction outer side, is provided to a lower end of the seat back 16, and the lower-end roller 13 is engaged with the slide rail 3 slidably to the rear and front sides. A middle fulcrum S2 is set in a middle section of the seat back 16, and the middle fulcrum S2 and the bracket 8 are connected with each other by a back link 22. Since the end portions of the back link 22 and the cushion link 19 are supported to the bracket 8 via shafts, it is not necessary to give a process for the supporting via shafts to the slide rail 3. As a result, manufacture of the slide rails 3 becomes easy, and deterioration of the rigidity of the slide rail 3 can be prevented.

Figure 1:
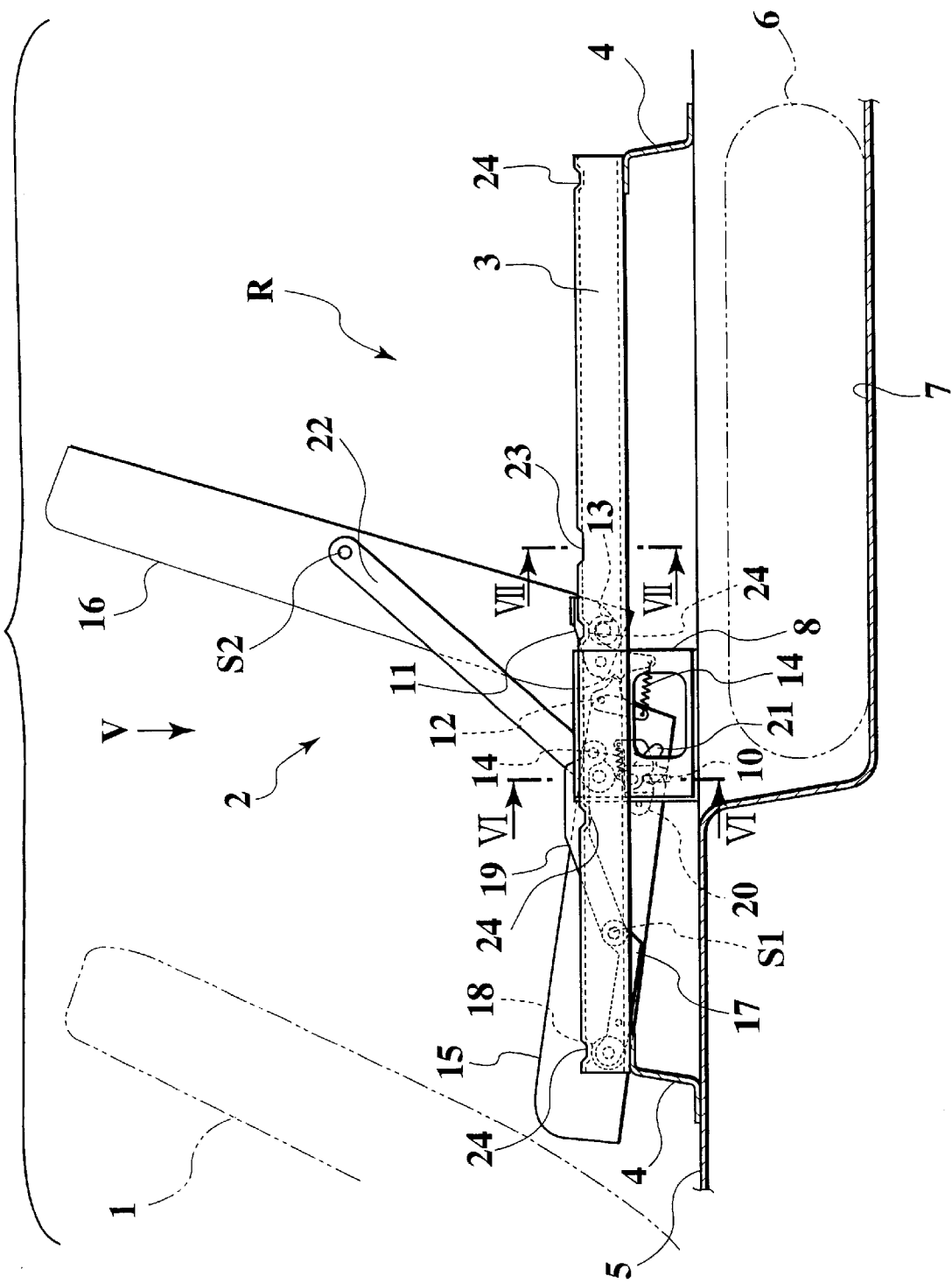
FIG. 1 is a side view showing a seated state of a third seat according to one embodiment of the present invention.

As shown in FIG. 1, in the seated state of the third seat 2, the lock plate 21 of the seat cushion 15 is engaged with the striker 10, and the hook 11 of the bracket 8 is engaged with the lower-end roller 13 of the seat back 16 so that the seated state is maintained. The cushion seat 15 and the seat back 16 in the seated state can be changed to a flat state, as mentioned later, by inverting the seat cushion 15 and folding the seat back 16 to the front side.

The front roller 18 of the seat cushion 15 and the lower-end roller 13 of the seat back 16 can be slid to the front-and-rear direction in the slide rail 3, and the bracket 8 stands in a range where it does not interfere with the front roller 18 and the lower-end roller 13.

Figure 7:
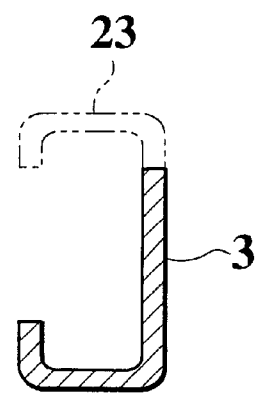
FIG. 7 is a sectional view taken along the arrow VII—VII in FIG. 1.

A notched section 23 where the lower-end roller 13 can be taken in and out is formed in the upper portion of the slide rail 3 within a moving range of the lower end-roller 13 in the slide rail 3 (see FIG. 7).

In addition, as for an up-and-down dimension of the slide rail 3, only portions 24, which correspond to the rollers 13 and 18 in the seated position and in the flat position, coincide with the diameters of the rollers 13 and 18 by slightly lowering their upper surfaces. The other portions are set so as to have larger dimensions than the diameters of the rollers 13 and 18. After the whole slide rail 3 is formed, the corresponding portions 24 have a precision dimension by partial post-processing. As for the slide rail 3 of the present embodiment, since only the up-and-down dimension of the corresponding portions 24 is set so as to coincide with the diameters of the rollers 13 and 18, the manufacture and installation adjustment of the slide rail 3 become easier than the conventional case that the up-and-down dimension of the whole slide rail 3 is set accurately. Moreover, since the up-and-down dimension is set to substantially coincide with the diameters of the rollers 13 and 18 by lowering the upper surface of the slide rail 3 partially, the lower surface of the slide rail 3 is flat along the longitudinal direction, and the rollers 13 and 18 move easily.

There will be described below an operation method of flattening the third seat 2. In the seated position before the flattening, since the up-and-down dimensions of the corresponding portions 24 of the slide rail 3 coincide with the diameters of the rollers 13 and 18, looseness in the up-and-down direction in the seated position does not occur.

Figure 2:
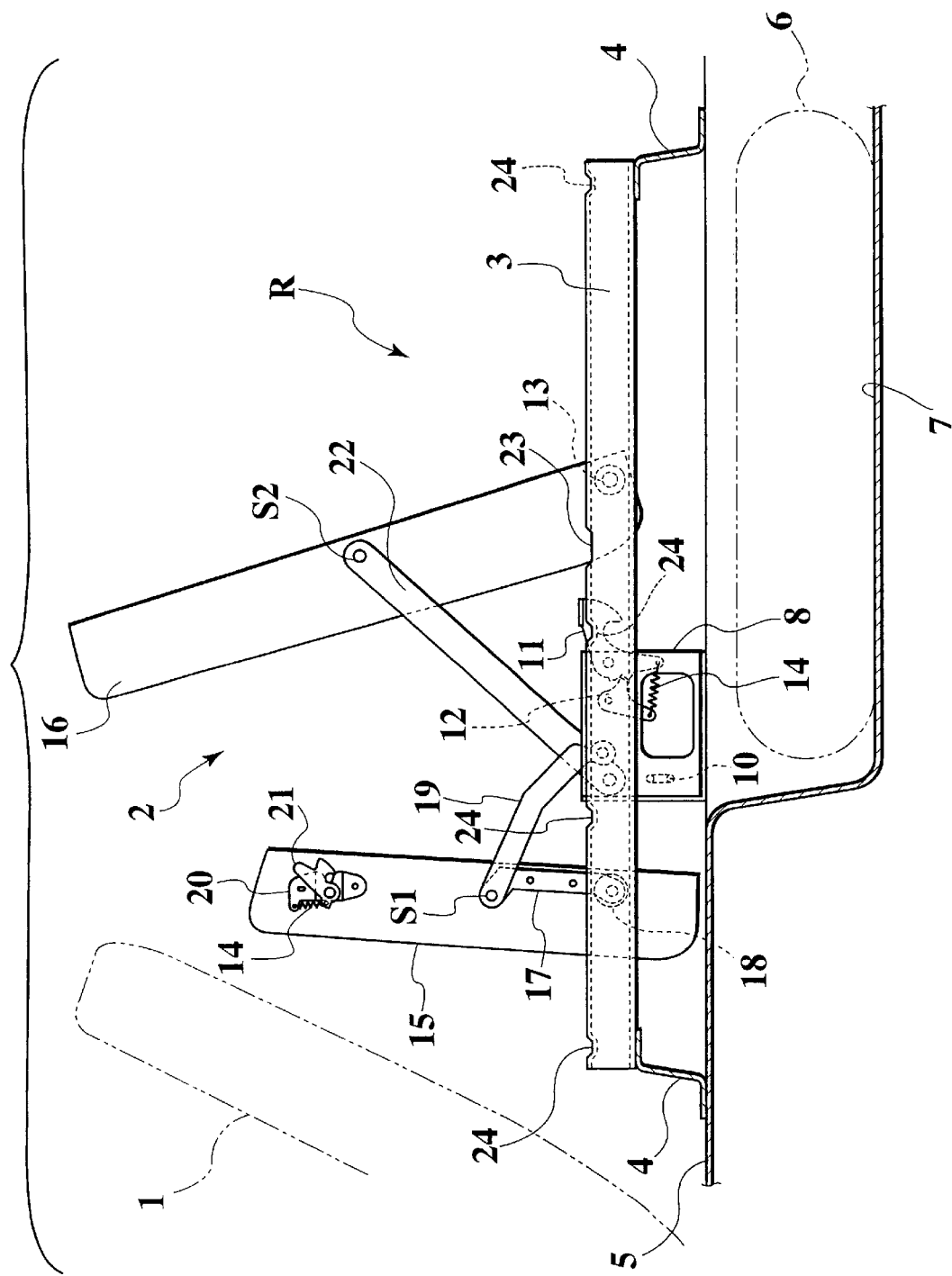
FIG. 2 is a side view showing a on-flattening state.
Figure 3:
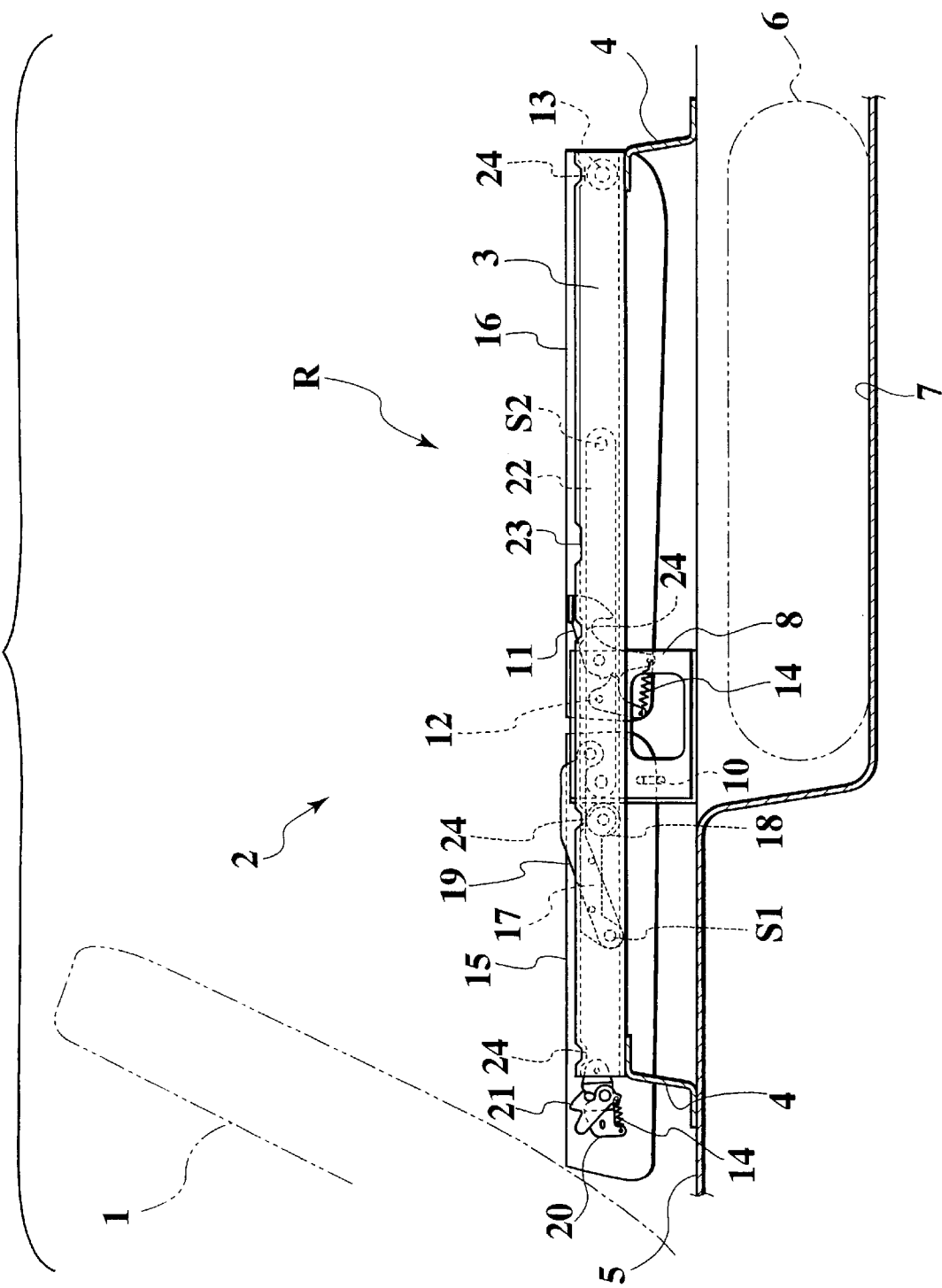
FIG. 3 is a side view showing a flattened state.

In order to flatten the third seat 2, at first, the seat cushion 15 is pivoted to the front side so as to be inverted. Since the lock plate 21 is engaged with the striker 10 with the striker 10 in the curved section 20a of the fixed plate 20 in the seated state, the lock plate 21 is pivoted to the release direction so that the engagement of the lock plate 21 with the striker 10 is released. Next, after the rear end portion of the seat cushion 15 is lifted so as to stand once (see FIG. 2), the seat cushion 15 is pivoted to the front side so as to be in an inverted state (see FIG. 3). When the seat cushion 15 is pivoted to the front side, since the front movement of the seat cushion 15 is restricted by the cushion link 19, while the seat cushion 15 slides the front roller 18 to the rear side, it inverts on the spot. Therefore, even if an enough space between the second seat 1 and the third seat 2 is not provided, the inversion of the seat cushion 15 is not interfered. Here, the inverted state of the seat cushion 15 is horizontally maintained with the seat cushion 15 being placed on a supporting base, not shown, formed on the floor 5.

Next, the seat back 16 is folded front so as to be in the horizontal state. At first, the upper portion of the hook 11 is lifted so as to be pivoted to the release direction. Then, the projection 12a of the stopper 12 is engaged with the engagement section 11b at the upper side, and the release state is maintained (here, when the stopper 12 is pivoted to the clockwise direction in the drawing, the former engagement state with the engagement section 11a is returned). Therefore, when the seat cushion 15 is folded to the front side, namely, in the forward-rotational direction, the lower-end roller 13 slides in the slide rail 3 to the rear side so as to be in the horizontally and front-folded state. Since the front movement of the seat back 16 is also restricted by the back link 22, the seat back 16 pivots to the front side on the spot. Therefore, the seat back 16 does not interfere with the seat cushion 15 folded previously. Then, the horizontal state of the seat back 16 is also maintained by the supporting base, not shown, formed on the floor 5.

The rear surface of the seat back 16 in the horizontal state becomes level with the back surface of the seat cushion 15, and thus the rear surface and the back surface form the flat and continuous surface.

Also in the flat position, since the corresponding portions 24 of the slide rail 3 correspond to the rollers 13 and 18, looseness in the up-and-down direction does not occur. Moreover, in the flat state between the seat cushion 15 and the seat back 16, since their front movements are restricted by the cushion link 19 and the back link 22, there arises no problem even if the lock by means of the lock plate 21 and the hook 11 is released.

According to the embodiment, while the seat cushion 15 and the seat back 16 allow the front roller 18 and the lower-end roller 13 to slide to the rear side along the slide rail 3, they pivot on the spot so as to be in the inverted and front-folded state. As a result, the embodiment is applicable to an automobile where an enough space is not provided between the front second seat 1 and the third seat 2.

Figure 4:
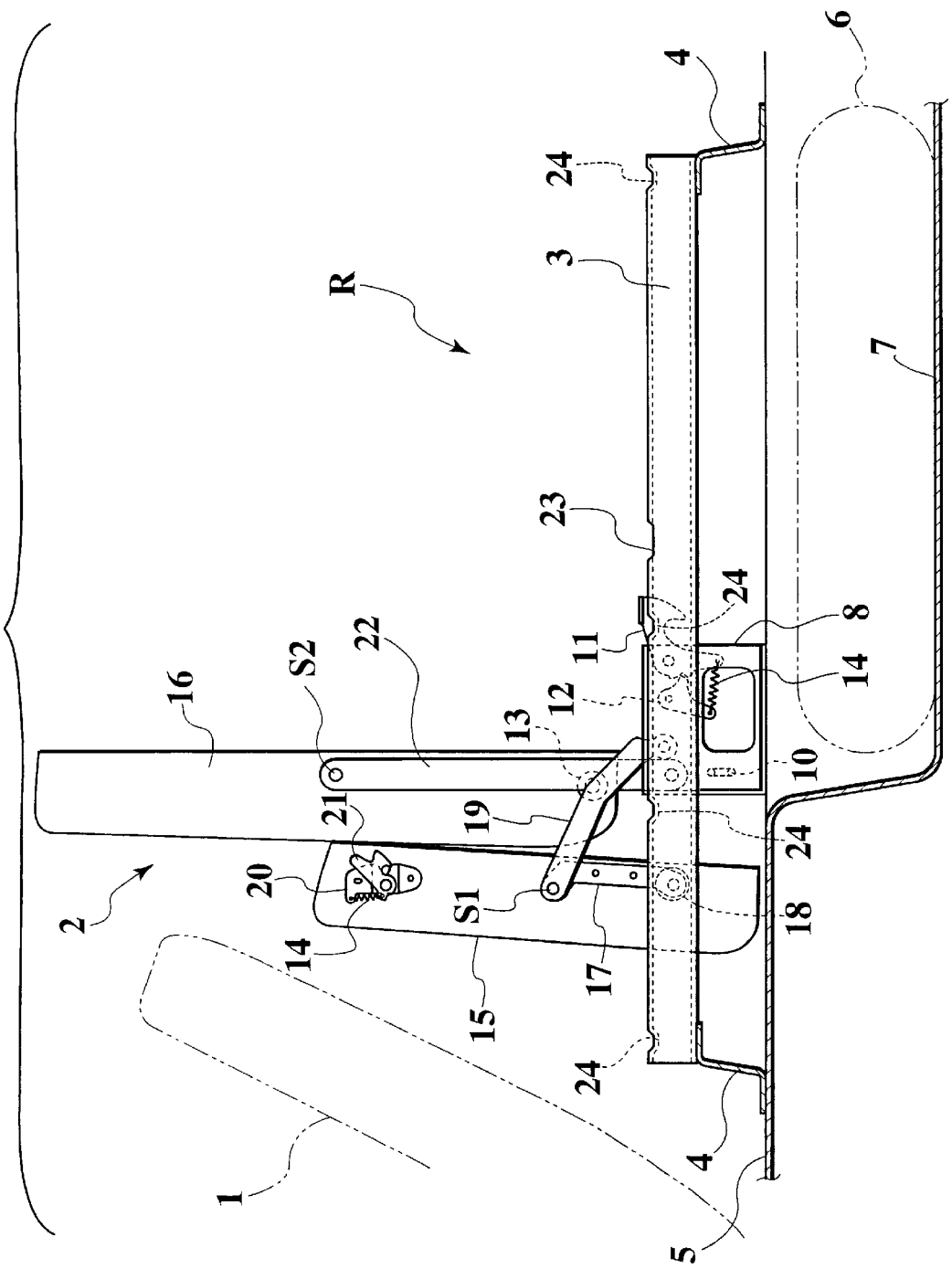
FIG. 4 is a side view showing a state that a lower-end roller is taken out of a notched section.
Figure 5:
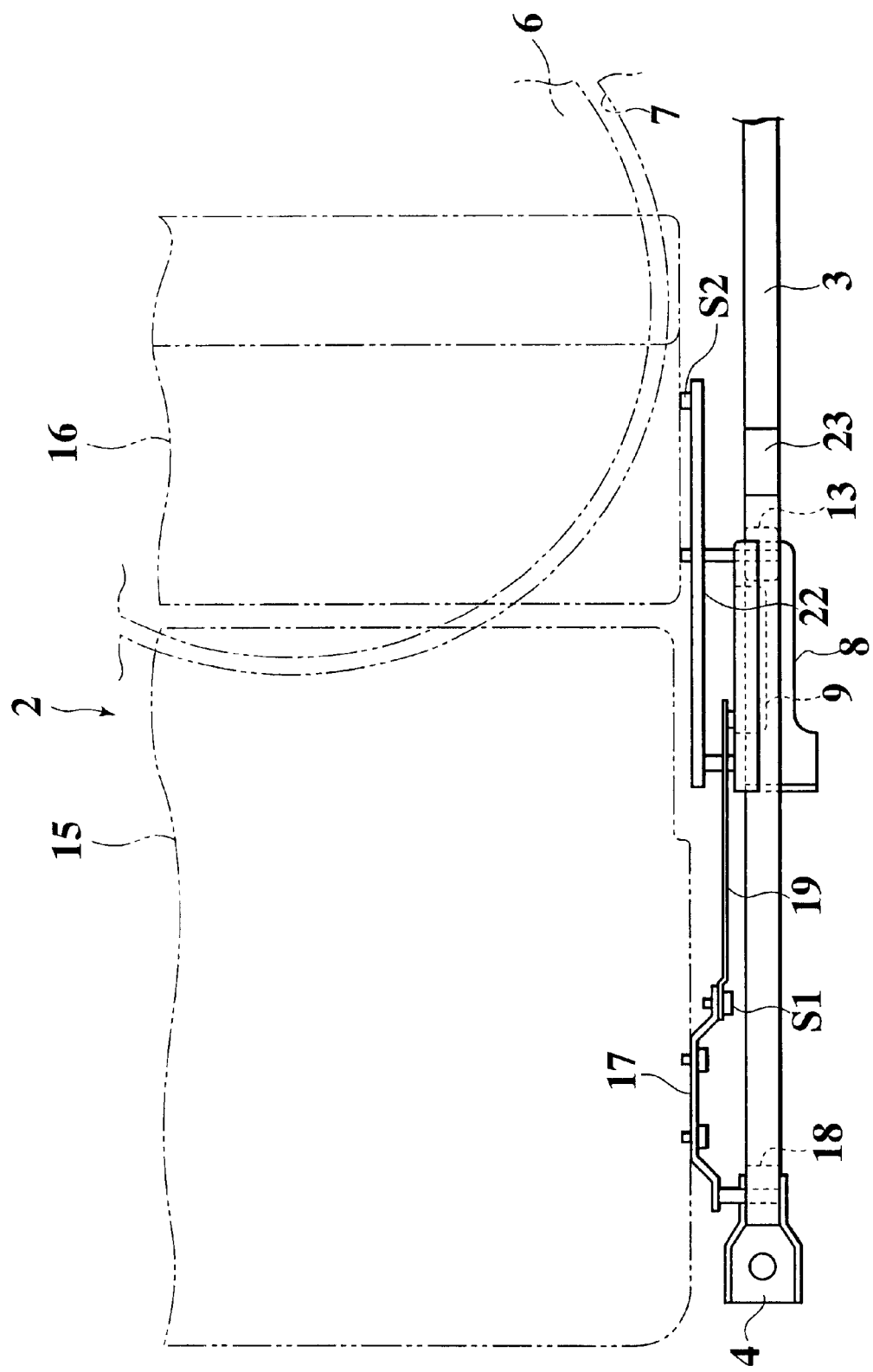
FIG. 5 is a plan view taken in the direction of the arrow V in FIG. 1.

In addition, in the present embodiment, since the notched section 23 where the lower-end roller 13 of the back link 22 can be taken in and out is formed in the upper portion of the slide rail 3, as shown in FIG. 4, the seat back 16 can be moved to the front side sufficiently with it standing by taking the lower-end roller 13 out of the notched section 23 upward. As a result, the spare tire 6 can be taken in and out of the concave section 7 easily. When the spare tire 6 is finished being taken in and out, the lower-end roller 13 is returned from the notched section 23 into the slide rail 3.

In the above description, the fixing link 17 is provided to the side surface of the seat cushion 15 and the front roller 18 and the middle fulcrum S1 are set to the fixing link 17, but the front roller 18 and the middle fulcrum S1 may be independently provided to the side surface of the seat cushion 15 similarly to the seat back 16.

The entire contents of Japanese Patent Application P10-211461 (filed on Jul. 27, 1998) are incorporated herein by reference.

Although the invention has been described above by reference to certain embodiments of the invention, the invention is not limited to the embodiments described above. Modifications and variations of the embodiments descried above will occur to those skilled in the art, in light of the above teachings. The scope of the invention is defined with reference to the following claims.

What is claimed is:

1. A flattable seat structure of an automobile, comprising:
a slide rail fixed to a floor of the automobile;
a seat cushion composing a seat, the seat cushion having a front roller at its front side projected to a vehicle transverse direction outer side, the front roller being engaged with the slide rail in a front-and-rear direction slidably;
a first lock mechanism for maintaining the seat cushion in a seated state;
a seat back composing the seat, the seat back having a lower-end roller at its lower end projected to the vehicle transverse direction outer side, the lower-end roller being engaged with the slide rail in the front-and-rear direction slidably;
a second lock mechanism for maintaining the seat back in a seated state;
a cushion link whose one end is connected with a middle fulcrum of the seat cushion positioned in a rear side further than the front roller, the other end of the cushion link being connected with a middle portion of the slide rail; and
a back link whose one end is connected with a middle fulcrum of the seat back positioned in an upper side further than the lower-end roller, the other end of the back link being connected with the middle portion of the slide rail,
wherein after the first lock mechanism is released, the front roller is slid to the rear side so that the seat cushion is turned over in a forward-rotational direction; and
wherein after the second lock mechanism is released, the lower-end roller is slid to the rear side so that the seat back is folded in a forward-rotational direction,
thereby a back surface of the seat cushion, which faces upward and is in a horizontal state, is substantially level with a rear surface of the seat back which faces upward and is in the horizontal state.

2. A flattable seat structure of an automobile according to claim 1, further comprising:
a fixing link fixed to a side surface of the seat cushion, the front roller being provided to a front end of the fixing link, the middle fulcrum being provided at a rear end of the fixing link.

3. A flattable seat structure of an automobile according to claim 1, further comprising:
a bracket provided to a vicinity of the middle portion of the slide rail, the bracket supporting the cushion link and the back link so that they are capable of pivoting.

4. A flattable seat structure of an automobile according to claim 3, wherein
the bracket is formed with a stepped section for upwardly supporting the middle portion of the slide rail from a lower side of the slide rail.

5. A flattable seat structure of an automobile according to claim 1, wherein
a notched section where the lower-end roller is taken in and out is formed on an upper portion of the slide rail.

6. A flattable seat structure of an automobile according to claim 1, wherein
portions of the slide rail, which correspond to a position where the front roller is located when the seat cushion is in the seated state, to a position where the front roller is located when the seat cushion is in the horizontal state, to a position where the lower-end roller is located when the seat back is in the seated state and to a position where the lower-end roller is located when the seat back is in the horizontal state, are provided so that their dimensions in the up-and-down direction substantially coincide with diameters of the front roller and the lower-end roller; and
a dimension of the slide rail in the up-and-down direction other than the four positions is set so as to be larger than the diameters of the front roller and the lower-end roller.

7. A flattable seat structure of an automobile according to claim 6, wherein
the slide rail is composed of an upper surface section, a side surface section and a lower surface section; and
the upper surface section of the slide rail corresponding to the four positions is projected downward,
thereby the dimension between a lower surface of the upper surface section and an upper surface of the lower surface section substantially coincides with the diameters of the front roller and the lower-end roller.

8. A flattable seat structure of an automobile according to claim 5, wherein
a concave section for housing luggage including a spare tire is formed in a position below the seat back on the floor of the automobile.

* * * * *